United States Patent [19]

Wnek et al.

[11] Patent Number: 4,672,093

[45] Date of Patent: Jun. 9, 1987

[54] SUBSTITUTED ACETYLENIC POLYMERS AND CONDUCTIVE MATERIALS FORMED THEREFROM

[75] Inventors: Gary E. Wnek, Ashland; Duncan H. Whitney, Cambridge, both of Mass.

[73] Assignee: Massachusetts Institute of Technology, Cambridge, Mass.

[21] Appl. No.: 872,096

[22] Filed: Jun. 6, 1986

[51] Int. Cl.$^4$ ................................................ C08F 8/02
[52] U.S. Cl. ................................ 525/356; 525/359.5; 525/366; 525/328.1
[58] Field of Search ...................... 525/356, 359.5, 366

[56] References Cited

U.S. PATENT DOCUMENTS

| | | | |
|---|---|---|---|
| 3,562,231 | 2/1971 | D'Alelio | 525/328.1 |
| 3,704,286 | 11/1972 | Schafer et al. | 525/359.5 |
| 4,011,378 | 3/1977 | White | 525/328.1 |
| 4,394,304 | 7/1983 | Wnek | 252/520 |
| 4,412,942 | 11/1983 | Naarmann et al. | 525/328.1 |
| 4,444,970 | 4/1984 | Weddigen | 526/285 |
| 4,447,583 | 5/1984 | Hocker et al. | 525/328.1 |
| 4,528,122 | 7/1985 | Murase et al. | 525/328.1 |

FOREIGN PATENT DOCUMENTS

| | | |
|---|---|---|
| 3140448 | 4/1983 | Fed. Rep. of Germany . |
| 3238246 | 4/1984 | Fed. Rep. of Germany . |
| 57-192406 | 11/1982 | Japan . |
| 58-104911 | 6/1983 | Japan . |

OTHER PUBLICATIONS

Glavin et al., *Conductive Hybrids Based on Polyacetylene: Copolymers and Blends*, 1984.
Dandreaux et al., *Chemical Modification of Polyacetylene: Copolymer and Blends*, pp. 541-543, vol. 48, 1983.

*Primary Examiner*—Joseph L. Schofer
*Assistant Examiner*—Bernard Lipman
*Attorney, Agent, or Firm*—James E. Maslow; Thomas J. Engellenner

[57] ABSTRACT

A novel route to the manufacture of substituted polyacetylenes is disclosed in which polyacetylene is first reduced to render it n-type conductor and then treated with an organic halide to form an organic-substituted polyacetylene.

16 Claims, No Drawings

SUBSTITUTED ACETYLENIC POLYMERS AND CONDUCTIVE MATERIALS FORMED THEREFROM

BACKGROUND OF THE INVENTION

The U.S. Government has rights in this invention pursuant to U.S. Navy Contract No. N00014-83-K-0673.

The technical field of this invention is conductive polymers and, in particular, methods of preparing organic-substituted polyacetylenes and the like for electrically conductive applications.

Conductive polymers have attracted considerable interest in industry as substitutes for metallic conductors in a wide variety of applications conducting electricity. For examples, conductive polymers are sought after as electrode materials in batteries, as electromagnetic shielding, and in semiconductor fabrication. For batteries in particular, paramount criteria are that the electrode be able to store and release significant amounts of charge per unit volume in unit weight. Among electroactive polymers, reduced polyacetylene is particularly attractive because of its high charge storage capacity.

However, highly reduced polyacetylene is reactive with most electrolytes. Many electrolyte salts in solvents that have good oxidative stability, such as lithium perchlorate in polypropylene carbonate, react irreversibly with highly reduced polyacetylene, thereby lowering its conductivity and charge storage capacity. Polyacetylene also suffers from significant mechanical limitations. It is intractable (i.e., practically insoluble in solvents, and it does not soften or melt), precluding fabrication of articles by conventional polymer processing techniques.

Efforts have been made to improve the stability and processability of polyacetylene. For example, U.S. Pat. No. 4,394,304 issued to the one present inventor discloses methods of forming conductive polymers by in situ polymerization of acetylene within a matrix of a more processible polymer. Another approach disclosed, for example, in U.S. Pat. No. 4,444,970 by Weddigen involves the manufacture of substituted polyacetylene by mixing a substituted acetylene monomer with a regular acetylene monomer and then inducing polymerization. Substituted poylyacetylenes so produced are swellable and deformable, thus making them more useful in the manufacture of parts.

There exists a need for conductive polymers utilizing the change storage properties of polyacetylene but having improved processability, stability and mechanical integrity.

SUMMARY OF THE INVENTION

A straight-forward and simpler route to the manufacture of substituted polyacetylenes is disclosed herein. The invention is particularly well-suited for the manufacturing of organic-substituted polyacetylenes. According to the invention, polyacetylene is first reduced to render it an n-type conductor and then treated with an organic halide to form an organic-substituted polyacetylene. The techniques disclosed herein are less laborious and more easily controlled than prior art techniques.

In the first processing step according to the invention, polyacetylene is synthesized and then reduced to create radical-anion species and/or anions along its backbone. A variety of reducing agents can be used to create these reactive sites. For example, polyacetylene can be treated with various salts of highly reactive radical anions (e.g., naphthalene or benzophenone), or anions (e.g., diphenylmethyl, triphenylmethyl, fluorenyl, or indenyl anions). Sodium (or other alkali) naphthalenide salts are particularly useful. Other n-type doping techniques can also be used including organolithium doping (e.g., butyl lithium), and electrochemical doping.

In the second step of the reaction, the reduced polyacetylene is exposed to an organic halide in order to introduce organic groups along the polymer backbone at the reactive sites. The organic halides are typically lower alkyl halides, ranging from 1 to about 10 carbon atoms in chain length. Suitable halogens for the organic halide reactant include chloride, bromide, and iodide. (Alkyl fluorides are typically not preferred because the reactive sites along the polyacetylene backbone lack sufficient electron affinity to break the CF bond). Both straight chain and branched organic groups can be incorporated along the polyacetylene backbone using the methods of the present invention. The reactions described herein are preferably conducted in an inert atmosphere or under high vacuum. Non-protic solvents are preferred and all solvents and reagents should be thoroughly dried, dearated and distilled before use.

In general, the reaction can be depicted as follows:

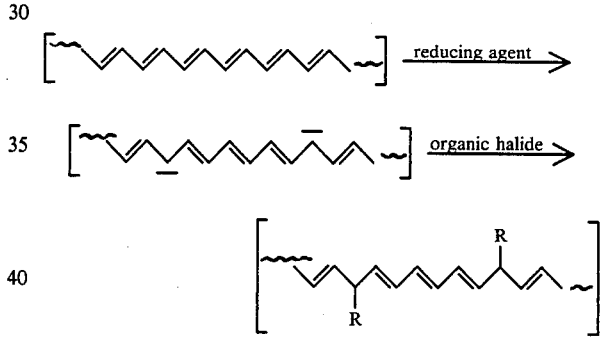

The properties of the organic-substituted polyacetylenes formed by the present invention differ markedly from the pristine polyacetylene precursors. The organic-substituted polyacetylenes are solvent swellable (i.e., rubbery when wetted with a solvent such as acetone, toulene or tetrahydrofuran) while pristine polyacetylene is quite brittle.

The organic-substituted polyacetylenes produced by the methods disclosed herein can be doped to exhibit n-type or p-type electrical conductivity. Suitable dopants for affecting p-type doping include, for example, $I_2$, $Br_2$, $AsF_5$, and nitrosyl salts containing non-nucleophilic anions, such as $ClO_4{-}$, $PF_6{-}$, $AsF_6{-}$, $SO_3CF_3{-}$, $NO_3{-}$, and $SO_4{-}$. Many of these anions can be introduced by electrochemical techniques as well. N-type doping can be accomplished the reducing agents described above (e.g., sodium naphthalenide) or again by electrochemical means.

The invention will next be described in connection with certain preferred embodiments. However, it should be clear to those in the art that various additions, subtractions and other modifications can be made to the present teachings without departing from the spirit and scope of the invention. For example, although the examples detailed below involve the preparation of alkyl-substituted polyacetylenes, it should be clear that other organic reactants can be employed to obtain other organic substitutions (e.g. aryl-substituted polyacetylenes and the like) Additionally, polar functionalities attached to organic reactants can also be introduced so long as they are appropriately protected so as not to interfere with the addition reaction to the polyacetylene.

DETAILED DESCRIPTION

The invention will be described in connection with the following non-limiting examples.

EXAMPLE 1

Cis-polyacetylene films were prepared at −78 degrees C using the technique described in Shirakawa et al, Vol. 4, *Synthetic Metals*, p. 43 (1981) herein incorporated by reference. Elemental analyses of the as-synthesized pristine polymers indicated CH contents of greater than 99%. The polyacetylene films were n-doped by immersion in a 0.5M solution of sodium naphthalenide in tetrahydrofuran (THF) for 24 hours and then washed with thoroughly dry THF in a dry box. The charge-carrier concentration were determined gravimetrically by accounting for the weight of the counterions (Na+) incorporated. Typical compositions found were $[(CH)Na_y]_x$, where $y=0.20-0.25$.

In the next stage of the reaction, the reduced polyacetylene was exposed to 1-bromo-pentane. The reaction was allowed to proceed in a molar excess of the alkyl halide in a dry box for 24 hours. Preferably, the molar ratio of polyacetylene to alkyl halide ranges from about 1:1 to about 1:10. After the reaction, the film was found to be considerably more rubbery than the starting polyacetylene material. The film was washed thoroughly with fresh THF and dried on a vacuum line.

EXAMPLE 2

A polyacetylene film material prepared as described above in connection with Example 1 and reduced in a similar manner, was treated with another alkyl halide, 1-chloro-pentane. Again, a molar excess of the alkyl halide was employed and the reaction was allowed to proceed for 24 hours in a dry box. A rubbery film was again obtained, washed in THF and thoroughly dried in a vacuum line.

EXAMPLE 3

Another polyacetylene film was prepared by the Shirakawa method and then reduced to obtain an n-type conductive polyacetylene material. Sodium naphthalenide was again used as the reducing agent, and the film was thoroughly washed with THF before reaction with a third type of alkyl halide, 1-iodo-pentane. As before, the reaction was conducted in a molar excess of the alkyl halide and allowed to proceed for 24 hours in a dry box. Once again, a rubbery film was obtained.

EXAMPLE 4

Another n-type, reduced polyacetylene film was prepared as described above and, this time reacted with a branched alkyl halide, 2-bromo-pentane. Again, the reaction was conducted in a molar excess of alkyl halide and allowed to continue for 24 hours in a dry box. The reaction again yielded a rubbery film.

EXAMPLE 5

Another polyacetylene film was prepared in accordance with the method described above in Example 1 and was again reduced with sodium naphthalenide to render it a n-type conductor. In this example, an 8-carbon chain alkyl halide, 1-bromo octane was employed to graft octyl functional groups onto the radical anion sites of the polyacetylene. As before, the reaction was conducted in a molar excess of the alkyl halide, and the resulting film was again deformable and swellable.

EXAMPLE 6

Each of the films obtained in Examples 1-5 were doped by exposing the substituted polymer to a vapour stream of iodine carried in deoxygenated and dried argon. The doped polymers were subsequently subjected to a dynamic vacuum ($10^{-5}$ torr) for 24 hours to remove adsorbed iodine. Conductivity measurements were then taken at room temperature by the standard 4-probe method. The results of conductivity measurement on the doped, alkyl-substituted polyacetylene compounds produced by the methods of Examples 1-15 above, are described below in Table 1.

TABLE 1

| | Conductivity of Substituted Polyacetylenes | | |
|---|---|---|---|
| Example | Alkyl Halide | Composition | Conductivity |
| 1 | 1-Br—pentane | y = 0.09 | 3.4 |
| 2 | 1-Cl—pentane | y = 0.09 | 0.8 |
| 3 | 1-I—pentane | y = 0.09 | 5.0 |
| 4 | 2-Br—pentane | y = 0.09 | 0.5 |
| 5 | 1-Br—octane | NA | ≈3.0 | a. For each of Examples 1-4, the starting n-type composition $[(CH)Na_y]_n$ was about $y = 0.23-0.26$, and the final film composition $[(CH)(pentyl)_y]_n$ was determined by IR analysis. Comparable data for the octyl-substituted sample was not available.
b. Conductively measurements were taken after $I_2$-doping. The maximum conductivities, $\sigma$ max, ($\Omega^{-1}$ cm$^{-1}$) were measured by standard four point methods.

Certain generalizations can be made concerning the conductivity and mechanical properties or organic-substituted polyacetylene materials prepared according to the invention. There is a trade-off between organic substitution and conductivity; the greater the degree of substitution, the lower the conductivity. However, the present invention permits better control over the level of substition and, hence, the conductivity. Moreover, the methods of the present invention offer greater versatility than prior art copolymerization and techniques as means for preparing substituted polyactylenes. There is potential for introducing a much wide variety of functionalities and thereby impart greater processability or stability or both to polyacetylene-based conductive materials.

We claim:
1. A process for preparing a substituted polyacetylene, the process comprising
   A. reducing a polyacetylene material to render it an n-type conductor, and
   B. treating the reduced polyacetylene with an alkyl halide to form an alkyl substituted polyacetylene.
2. The process of claim 1 wherein the step of reducing polyacetylene material further comprises treating the polyacetylene material with a reducing agent chosen from the group of naphthalene, benzophenone, diphenylmethyl, triphenylmethyl, fluorenyl, and indenyl salts.
3. The process of claim 2 wherein the reducing agent is an alkali naphthalide.
4. The process of claim 3 wherein the reducing agent is sodium naphthalide.
5. The process of claim 2 wherein the reducing agent is an organolithium compound.

6. The process of claim 1 wherein the step of reducing a polyacetylene material further comprises of reducing the polyacetylene material in an electrolytic cell.

7. The process of claim 6 wherein the electrolytic cell contains an electrolyte comprising lithium perchlorate in tetrahydrofuran.

8. The process of claim 1 wherein the alkyl halide is an alkyl chloride.

9. The process of claim 1 wherein the alkyl halide is an alkyl bromide.

10. The process of claim 1 wherein the alkyl halide is an alkyl iodide.

11. The process of claim 1 wherein the alkyl halide is an alkyl halide having a chain length of one to ten carbon atoms.

12. The process of claim 1 wherein the alkyl halide is a straight chain compound.

13. The process of claim 1 wherein the alkyl halide is a branched chain compound.

14. The process of claim 1 wherein the process further comprises doping the substituted polyaceltylene with a doping agent to render it conductive.

15. The process of claim 14 wherein the step of doping the substituted polyacetylene further includes treating the substituted polyacetylene with a p-type dopant selected from the group consisting of $I_2$, $Br_2$, $AsF_5$, and at least one of the nitrosyl salts containing non-nucelophilic anions, $ClO_4-$, $PF_6-$, $AsF_6-$, $SO_3CF_3-$, $NO_3-$, and $SO_4-$.

16. The process of claim 4 wherein the step of doping the substituted polyacetylene further includes treating the substituted polyacetylene with an n-type dopant selected from the group consisting of naphthalene, benzophenone, diphenylmethyl, triphenylmethyl, fluorenyl, and indenyl salts.

* * * * *